(12) United States Patent
Kössi et al.

(10) Patent No.: US 7,295,568 B2
(45) Date of Patent: Nov. 13, 2007

(54) APPARATUS, METHOD AND SYSTEM FOR DECISION MAKING TO SUPPORT NETWORK SELECTION FOR DATASCASTING IN HYBRID NETWORKS

(75) Inventors: Jouni Kössi, Espoo (FI); Martti Virtanen, Hilsinki (FI); Sami Savio, Tampere (FI); Mika Kahola, Helsinki (FI)

(73) Assignee: Nokia Corporation, Espoo (FI)

( * ) Notice: Subject to any disclaimer, the term of this patent is extended or adjusted under 35 U.S.C. 154(b) by 855 days.

(21) Appl. No.: 10/749,644

(22) Filed: Dec. 31, 2003

(65) Prior Publication Data

US 2005/0172016 A1 Aug. 4, 2005

(51) Int. Cl.
*H04J 3/26* (2006.01)
(52) U.S. Cl. ............... 370/432; 370/352; 370/270; 370/389; 370/401; 370/486; 709/201; 709/202; 709/223; 709/224; 709/225; 709/238; 709/243
(58) Field of Classification Search ............... None
See application file for complete search history.

(56) References Cited

U.S. PATENT DOCUMENTS 6,023,159 A   2/2000   Heger

2003/0050067 A1   3/2003   Rozmaryn
2004/0045030 A1*  3/2004   Reynolds et al. ........... 725/110
2004/0117839 A1*  6/2004   Watson et al. ................ 725/87
2005/0097624 A1*  5/2005   Salo et al. ................... 725/136

FOREIGN PATENT DOCUMENTS

WO   WO 2004/036931 A2   4/2004

* cited by examiner

*Primary Examiner*—Raj K. Jain
(74) *Attorney, Agent, or Firm*—Morgan & Finnegan, L.L.P.

(57) ABSTRACT

The disclosure details the implementation of an apparatus, method, and system for an network selector for datacasting in hybrid networks (NSDHN). In one aspect, the disclosure teaches an efficient delivery decision mechanism that takes into account efficiencies that may be achieved by employing one network delivery system over another for any given area. In another aspect, the disclosure teaches how to dynamically select the bearer for IP multicast data delivery in hybrid networks. Also, the disclosure teaches a network delivery selector based on Simulated Annealing and genetic algorithms. The network delivery selector provides an extremely fast mechanism to establish an optimal delivery bearer dynamically. This allows the network delivery selector to combine unicast, multicast and broadcast network bearers in the same hybrid network to exploit their combined best properties and serve as many users as possible.

4 Claims, 5 Drawing Sheets

An example usage of Decision Making Entity in hybrid wireless networks

An example usage of Decision Making Entity in hybrid wireless networks

APPARATUS, METHOD AND SYSTEM FOR DECISION MAKING TO SUPPORT NETWORK SELECTION FOR DATASCASTING IN HYBRID NETWORKS

FIELD

The present invention is directed generally to an apparatus, method, and system of networking information, and more particularly, to an apparatus, method and system to determine an efficient manner in which to deliver content in an area having disparate networks.

BACKGROUND

Network Transfer Mechanisms

The proliferation and expansion of computer information systems coincides with an increase in network use. More and more often, people are using computer networks and software to transfer large amounts of data. The increased communications over the Internet has resulted in an explosion of data transfers and connections in various contexts.

There are three general manners of transferring content across a network: unicast, multicast, and broadcast. Unicast transmissions are sent from a single originator to a single receiving entity; they are point-to-point. An example of a unicast transmission is the simple downloading of a file over the Internet via TCP/IP packets. If there are multiple receivers wishing to obtain content across a unicast network, then each needs to establish its own data connection to an originator. Broadcast and multicast are methods for transmitting datagrams from a single source to several destinations (point-to-multipoint). Generally, multicast transmissions are sent to specific groups, whereas broadcast transmissions are sent to everyone in range. Both broadcast and multicast mechanisms conserve network bandwidth by sending a single stream of data to be obtained by multiple receivers. The universal mobile telecommunications system (UMTS) network, which was originally a broadcast network designed for video or audio broadcasting (e.g., digital video broadcasting—terrestrial (DVB-T) and digital audio broadcasting (DAB)), is able to provide both multicast and broadcast services. As the broadcast system was designed to distribute popular content to a large group or audience, the broadcast system is characterized as having a high bandwidth and wide cell coverage area. As such, it is suitable for distributing multimedia multicast/broadcast content that is targeted to a large group of users. To date, 3G release-4 and release-99 define two services with respect to point-to-multipoint communication—a cell broadcast service and an IP-multicast service. A cell broadcast service allows low bit-rate data to be transmitted to all subscribers in a set of given cells over a shared broadcast channel. An IP-multicast service allows mobile subscribers to receive multicast traffic. Another point-to-multipoint communication method, the multimedia broadcast/multicast service (MBMS), allows links to be used for distributing popular content to groups of users simultaneously. The use of a point-to-multipoint link saves radio spectrum resources if there are many users accessing the same information in a given cell.

In some systems like wideband code division multiple access (WCDMA), the transmission power limits the capacity. In such instances, using a common channel may consume more bandwidth resources than using multiple point-to-point links; for example, in case where there are only few users (e.g. less than 4) in the cell who shares the information.

SUMMARY

Although all of the aforementioned network delivery systems can coexist in the same area to varying degrees, no effective solution exists to manage and properly channel the large torrents of data that are being transmitted through these various networks. Often, user requested information is delivered in a sub-optimal manner by delivering the information via an inefficient communications bearer. Currently, no efficient delivery decision mechanism exists to take into account efficiencies that may be achieved by employing one network delivery system over another for any given area. Currently, there is no way to support the dynamic selection of the bearer for IP multicast data delivery in hybrid networks. Currently, access network selections are fixed and chosen manually. As such, the disclosed network delivery selector based on Simulated Annealing or genetic algorithms provides an extremely fast mechanism establish an optimal delivery bearer dynamically. This allows the network delivery selector to combine unicast, multicast and broadcast network bearers in the same hybrid network to exploit their combined best properties and serve as many users as possible.

In accordance with certain aspects of the disclosure, the above-identified problems of more optimally selecting a network delivery mechanism for a given area are overcome and a technical advance is achieved in the art of targeting data transmissions. An exemplary network selector for datacasting in hybrid networks (NSDHN) includes a method to obtaining an objective with requirements of delivery of datacasts over hybrid bearers of network communications for users within an area supported by the bearers. The method obtains restrictions for the objective, wherein the restrictions further establish requirements for the objective, wherein the restrictions establish capacity limits. The method also includes determining a state of the hybrid bearers of network communications, wherein each type of bearer has a limited service capacity for an area. Further, the method includes obtaining inputs for the objective and restrictions, wherein the inputs are obtained from the determined state and generating a simulated population of bearers configurations based on the objective, restrictions, state, and inputs. As such the method can instruct the bearers of network communications to deliver datacasts employing the best generated simulated configuration. This may be achieved by transferring a user receiving a datacast from one type of bearer to another type of bearer to satisfy the objective and restrictions, wherein the transfer results from the instructions that are based on the best generated simulated configuration as they are dynamically determined. Also the method includes increasing capacity for a type of bearer in the supported area, or, alternatively, decreasing capacity for a type of bearer in the supported area, if required to satisfy requirements of the objective.

In accordance with another embodiment, a dynamic network selector apparatus is disclosed. The apparatus has a memory for storing instructions and a processor that can issue the instructions stored in memory. The stored instructions issue signals to: obtain an objective with requirements of delivery of requested datacasts over bearers of network communications for users within an area supported by the bearers, obtain restrictions for the objective, determine a state of the bearers of network communications, obtain inputs for the objective and restrictions, generate a simulated population of bearers configurations based on the objective, and instruct the bearers of network communications to deliver datacasts employing the best generated simulated configuration

BRIEF DESCRIPTION OF THE DRAWINGS

The accompanying drawings illustrate various non-limiting, example, inventive aspects in accordance with the present disclosure.

The leading number of each reference number within the drawings indicates the first figure in which that reference number is introduced. As such, reference number 101 is first introduced in FIG. 1. Reference number 201 is first introduce in FIG. 2, etc.

DETAILED DESCRIPTION

Hybrid Network Environment Topology

Figure 1:
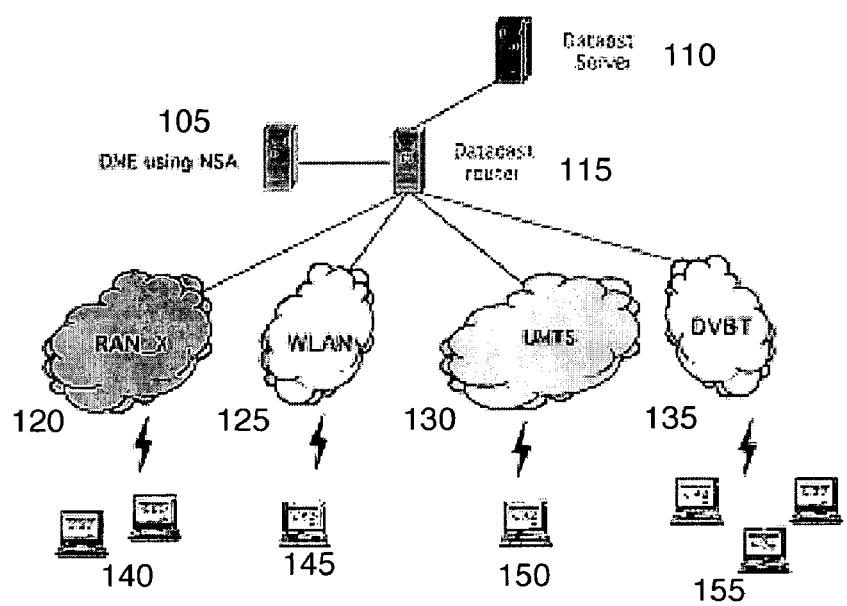
FIG. 1 is of a topology diagram illustrating one embodiment environment where a network selector for datacasting in hybrid networks (NSDHN) may be employed.

FIG. 1 illustrates one embodiment environment where a network selector for datacasting in hybrid networks (NSDHN) may be employed. In this environment, the NSDHN achieves more optimized service switching. The figure provides a generalized overview of data and decision making flow for the NSDHN.

Presented is an example topology 100, where a NSDHN is exhibited as a decision making entity (DME) employing a network selection algorithm (NSA) 105, is disposed in communication with a datacast router 115 and a datacast server 110. The datacast router itself may be disposed in communication with several different types of communications networks that can overlap across a certain area. Various example communications forms bearing a network include a radio access network (RAN) 120, a wireless local area network (WLAN) 125, a universal mobile telecommunications system (UMTS) 130, or a digital video broadcasting—terrestrial (DVBT) network 135. Each of these networks may have various terminals 140, 145, 150, 155 accessing some remote datacast server 110 as routed through the datacast router 115 and as selected by the NSDHN. It should be noted, that for purposes of illustration, each of the terminals is capable of communicating across any of these various communication forms bearing a network as they are each equipped with multiple transceivers allowing for such. These various terminals may take the form of cell phones, smart phones, laptops, and/or the like, which can access multiple communications networks forms.

In this example topology, a user entity (UE) may use any such terminal. The UE may explicitly send a request to receive a datacast. For example, some users may all request to see the same multicast program and as such they will organically form a multicast group. The DME will employ a NSA based on various factors, such as: user location, network load, and required quality of service (QoS) for the requested session. This will result in the selection of a network form to bear the communications and deliver the desired data (e.g., via an IP multicast) to all group members for the particular datacast. For example, the NSDHN will select a network communications bearer such as: one or multiple broadcast link(s) on a DVB-T network, one or multiple UMTS point-to-multipoint links, one or multiple UMTS point-to-point links, and/or any combination thereof.

In an alternative embodiment, the source of the multicast datacast indicates to the NSDHN various criteria such as: the targeted area for the content delivery; statistical information about the popularity of the content; statistical information about the user distribution within the targeted area, and/or the like. In such an embodiment, the NSDHN selects bearers to cover the targeted area taking into account the distribution of users and popularity of the content. The user does not send a "join" message to the network explicitly. Thus, the NSDHN is not aware which users want the content. Consequently, in such an embodiment, the datacast does not follow users as they move from location to location. If a user moves out from the pre-defined distribution area, the user will not be able to receive the multicast session.

Once the NSDHN arrives at a bearer selection, the selection decision from the DME 105 is signaled to a network entity, for example a datacast router 115, that is along the data path from the datacasting server 110 to the receiving terminals. If no network bearer has been selected for the receiving terminals, then the network entity should respond to the DME's decision by establishing a selected bearer (e.g., UMTS point-to-multipoint, DVB-T bearer or WLAN bearer). As such, the receiving terminals will receive data traffic via the selected bearer.

Inputs for the Decision Making Entity

Figure 2:
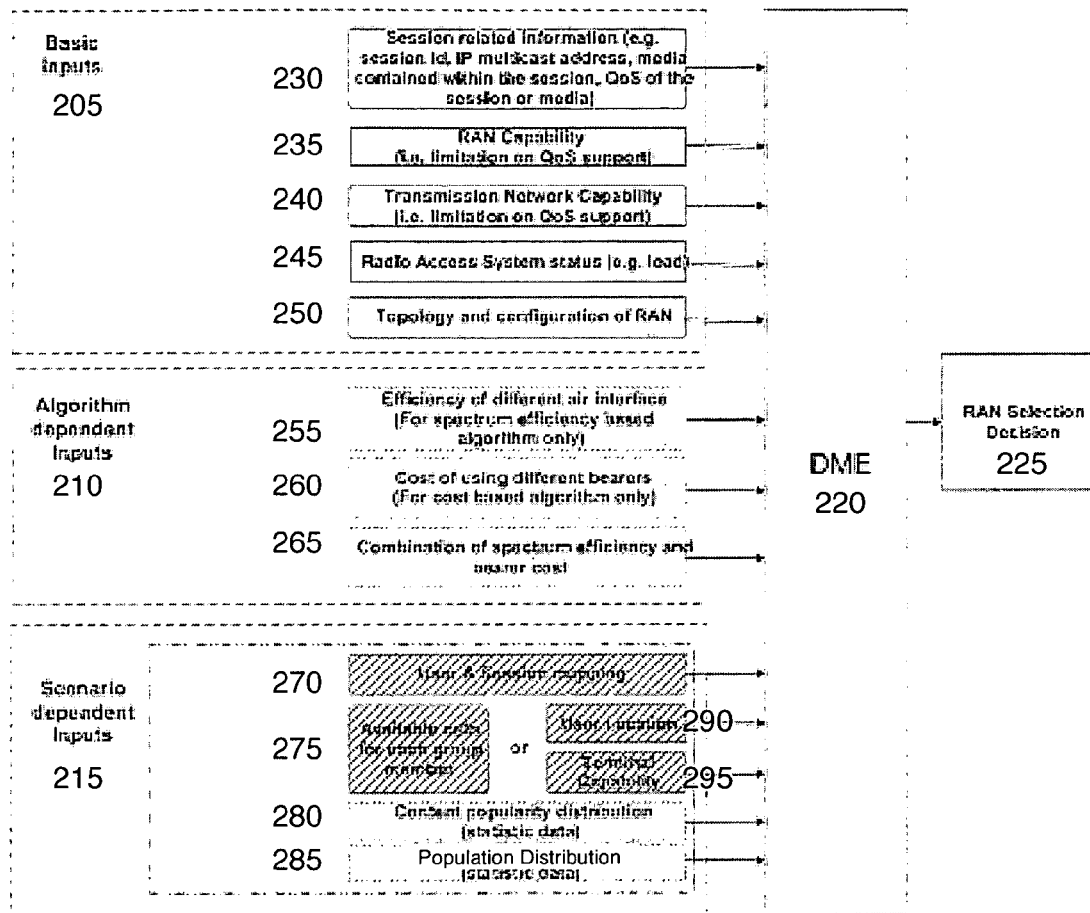
FIG. 2 is of a block diagram illustrating one embodiment the NSDHN input and output architecture.

FIG. 2 illustrates one embodiment of the NSDHN input and output 225 architecture 200. The inputs employed by the DME 220 may be grouped into the three categories: basic inputs 205, algorithm dependent inputs 210, and scenario dependent inputs 215. The DME may employ a database to store and retrieve all of the various inputs. The DME employs these inputs as a basis to establish a mechanism for selecting a communication transmission bearer type 225. This mechanism may take the form of a network selection algorithm (NSA) that may be employed by the DME to instruct the datacast router 115.

Basic Inputs

The DME employs the following basic inputs 205 irrespective of what criteria and/or algorithm are used to make the bearer selection decision 225: session related information 230, radio access network (RAN) capability 235, transmission network capability 240, radio access system status 245, and topology and configuration of each RAN 250.

Session related information 230 refers to the information associated with a given session. For example, information such as the ID of the session, IP address and port used by the session, QoS requirement of the session, are all session related 230. If the session contains more than one media type (e.g., one video stream, one audio stream and one text component), then the session information should contain the corresponding session information (e.g. address, port, QoS requirement, etc.) of each media type. Session related information should be provided by the service provider. For example, service discovery protocol (SDP) may be used to carry session-related information.

A radio access network (RAN) parameter 235 indicates the ability of a radio network and its QoS support. The parameter may be represented as a list containing information about multicast capabilities, average cell sizes and maximum bitrates that can be offered. This parameter is determined by the type of the network (e.g. UMTS or DVB-T) and the configuration of the network. This parameter should be provided by the operator of the access network and stored in the database of DME.

A transmission network capability parameter 240 indicates the ability of a transmission network and its QoS support. The parameter may be represented as a list containing information about multicast routing capabilities and maximum bitrates that can be supported. This parameter is determined by the type of the fixed network and the configuration of the network. This parameter should be provided by the operator of the transmission network and stored in the database of DME.

A radio access system status parameter 245 indicates the current status of the network. The parameter may be represented as a table containing information for each cell about current load and best bitrate that can be offered through it and core network. Some other possible quantities are discussed below. For example, the status might include the traffic load the radio access system. As the traffic load in a cell increases, the QoS that can be offered by a cell degrades. In the worst case, when a cell is fully loaded, there is no capacity to support a new datacast session. Thus, the radio access system status must be taken into account by a selection algorithm before a bearer selection decision is made. The parameters that reflect RAN status may include the downlink DCH throughput of each cell, Radio Resource Control (RRC or 3G) drop ratio, RRC-connection setup failures and/or the like. In addition to above, the traffic situation in the core network also affects the end-to-end quality of service provided to the multicast traffic. Thus, the status of the core network may be taken into account while selecting the access system. The parameters reflecting the status of the core network may include the delay and bandwidth associated with the traffic of the different classes. The status of a radio access system, both in a RAN and in a core system, may be obtained via network management system, e.g. NOKIA's NetAct. The DME employs both momentary load information and logged statistical status information.

Parameters for the topology and configuration of each RAN 250 include IDs, and coverage and downlink capacity of each cell. The topology and configuration of different radio access systems may be obtained from the network operator and stored in the DME database. The parameter may be represented as a table containing information mentioned above for each cell. Locations may be presented e.g. with normal latitude/longitude coordinate addresses.

Algorithm Dependent Inputs

The DME employs the following algorithm dependent inputs 210 with regard to a NSA 225: spectrum efficiency of different RANs 255; cost of using different bearer to transfer (e.g., unicast/multicast/broadcast) data 260; and any other multi-objective algorithm relating to accessibility, load balancing, blocking probability, economic, and/or the like factors 265.

The spectrum efficiency of different RANs parameter 255 may be optimized by the DME. If the goal of the selection is to maximize spectrum efficiency, the DME needs to know the spectrum efficiency of each cell. The spectrum efficiency may be specified as required. For example, if customer satisfaction is a goal, then one measure might be a system load that can support 98% user satisfaction. The parameter may be represented as kbps/MHz/cell. In order to compare spectrum efficiency of cells with different coverage and using different radio technology, the measurement unit kbps/MHz/km$^2$ can be used by the selection algorithm in a NSDHN. Since different radio networks have different radio reuse efficiency, the calculation of the spectrum efficiency (kbps/MHz/km$^2$) may take the frequency reuse factor into account. For example, in an UMTS system, spectrum efficiency is a function of the radio environment, user mobility and location, services and quality of service and propagation conditions. The variation can be quite large (e.g., 50%-100%). Therefore, most system simulations that attempt to offer some indication of the average spectral efficiency of WCDMA reflect only the results for some predefined cell conditions and user behavior. To obtain the spectrum efficiency values used by NSDHN, a simulation may be performed based on the given network topology and configuration. The computed spectrum efficiency should be stored in the NSDHN database.

The cost of using different bearer to transfer unicast/multicast/broadcast data parameter 260 may be minimized by the DME. If the NSA aims to minimize the finical cost of sending data over wireless bearer, then the cost of using each alternative bearer should be an input for DME. The cost of sending data over different bearer should be provided by the operator of radio access network. The parameter may be represented as a list of prices for the different rates which are available.

Any other multi-objective algorithm relating to accessibility, load balancing, blocking probability, economic factors, and/or the like parameters 265 may be optimized by the DME. These various objectives will depend on the particular needs deployment and will vary as such.

Scenario Dependent Inputs

The DME employs the following scenario dependent inputs 215 with regard to a NSA 225: user and session mapping 270; location of the UE 290 and the terminal capability and network plan of different RANs 295; and various inputs for multicasting 275, 280, 285. The inputs for multicasting include available cells for each group member in multicast case 275, content popularity distribution 280, and population distribution 285.

The user and session mapping parameter 270 list the identity of users that have joined a datacast session. This parameter may be represented by an actual list of IDs that have joined a multicast session and a count thereof. It lists the identity of users that have joined a multicast session. The user ID can be a Temporary Mobile Subscriber Identity (TMSI), an International Mobile Subscriber Identity (IMSI), and/or the like. The session can be identified either by a unique session ID (e.g., as in a SDP message or an IP address that can uniquely identify the session when combined with other specific data (e.g., network ID and start and end times). Further, a user may send a join message to a Serving GPRS Support Node (SGSN) in order to receive Multimedia Broadcast/Multicast Service (MBMS) multicast service. GPRS is General Packet Radio Service. Thus, the mapping between user ID and session ID (and/or address) should be available from the SGSN. In one embodiment, the network management system may obtain this mapping information from the SGSN and store the information in its database. Thus, the network management system can also be an alternative source for the mapping information.

The location of the user entity (UE) 290 and the terminal capability 295 and various RAN network plan parameters may be obtained by the DME. The users terminal capabilities may include which air interfaces can be supported. The location information may be obtained by accessing the UE's account information; there, accessing the roaming information for the last point of contact may be obtained. Alternatively, the location information may be obtained directly from a Home Location Register (HLR) or via a network management system. Additionally, the terminal capability input 295 may include the terminal's power consumption when receiving transmissions through different networks. The user's terminal capability information should either be reported by the UE to the DME or stored in the database of DME as static information. In an alternative embodiment, such information may be stored and accessed through the UE's account information. Based on the above information, DME derives the available cells for the UE.

The available cells for each group member of a multicast parameter 275 allows the DME to select an optimal bearer. The parameter enables the DME to know via which cells a group member is able to receive the data. The term "group" refers to users who have joined a given datacast session. This information may be obtain in a number of ways. In one embodiment, the UE directly reports cells that have acceptable downlink Signal to Interference Ratio (SIR) to the DME. Alternatively, the DME may obtain the measurement results from a Serving Radio Network Controller (SRNC). In another embodiment, the DME obtains measurement results from a network management system.

The content popularity distribution parameter 280 may be employed by the DRM in a NSA in order to predict the number of users requesting the same datacast session in a given cell. This allows the DRM to avoid unnecessary inter-system handover due to temporarily variation in multicast group size. Content popularity distribution may be used as an optional input for a DME algorithm.

The population distribution parameter 285 may be employed by the DRM in a NSA to account for variances in population distribution. For similar reasons mentioned above, population distribution can also be used as one optional input for DME algorithm in supporting UE initiated multicasts. The population distribution may include residential, temporary, work, and/or the like populations. For example, during office hours, the population in an industrial area is different from that during non-office hours when only a residential population remains. The population distribution can be obtained from external source, e.g., government statistics maintained in both centralized and local offices.

It should be noted that for either the population 285 or the content popularity 280 distribution parameters, a targeted area parameter may be included. Alternatively, a targeted area parameter may be employed on its own. This parameter indicates the geographical area where the content is to be distributed. This parameter may be given by the content provider or a multicast service provider Table 1, below, provides some examples of where (identified as column labels) the inputs (identified as row labels) may be obtained for the NSDHN. Some inputs, e.g., user location, may be obtained via several alternative sources.

TABLE 1

| | Content Provider | RAN Operator | Simulation | Network Management System | Multicast Service Provider | UE | SGSN | RNC | HLR | NSS Database | External database (e.g., statistics office) |
|---|---|---|---|---|---|---|---|---|---|---|---|
| Basic Input | | | | | | | | | | | |
| Session related information | | | | | X | | | | | | |
| RAN capability | | X | | X | | | | | | | |
| Transmission Network capability | | X | | | | | | | | | |
| Radio access system status | | | | X | | X | | X | X | | |
| Topology and configuration of RAN | | X | | X | | | | | | | |
| Algorithm dependent inputs | | | | | | | | | | | |
| Spectrum efficiency of different Radio Access Network | | | (X) | X | | | | | | | |
| Cost of using different bearer to transfer multicast data | | X | | X | | | | | | | |
| Scenario dependent input | | | | | | | | | | | |
| User and session mapping | | | | X | X | X | X | | | | |
| Available cells for each group member | | | | X | | X | | X | | | |
| User location | | | | X | | X | | | X | | |
| Terminal capability | | | | | X | X | | X | | | |
| Content popularity distribution | X | | | | X | | | | | X | |
| Population distribution | | | | X | | | | | | X | X |
| Targeted area | | | | X | | | | | | | |
| Targeted population | | | | X | | | | | | | |
| Terminal capability distribution | | | | X | | | | | | X | X |

Outputs

The bearer selection decision from NSDHN may be sent to a network element 115, which may establish or modify relevant configuration(s) and bearer(s). For example, the selection decision may be sent as a packet data protocol (PDP) context (PDP) and radio access bearer (RAB) so that data can be routed via the selected cells. It should be noted that the PDP context may refer to the information stored in the mobile station, in the serving GPRS support node and in the gateway GPRS support node when a connection to an external packet data network has been activated. The PDP context has network level information, which is used to bind a mobile station (MS) to various PDP addresses and to unbind the MS from these addresses after use.

Network Selection Algorithms

The DME may employ any number of network selection algorithms (NSA) depending on a given desired objective. The NSDHN may store a number of NSAs that are associated with certain types of content, network communication bearers, locations, sessions, and/or the like. As such, a given DME may retrieve and employ various NSAs that are useful for associated contexts. For example, a certain communication bearing location may be limited and should always be optimized to maximize data delivery. In another location where the costs of broadcasting are prohibitive, the communication bearing location may be designated to minimize costs above all other concerns. In either example, the DME may employ a lookup in the NSDHN database and retrieve appropriate NSAs matching such designations.

Expressing a System State

Data delivery involves the selection of a base station (if possible) for data delivery for every terminal node so that a given objective function is being minimized or maximized as is desired. The combination of base stations delivering data is called Base Station Combination (BSC). Thus, such optimized delivery can be formalized as follows (in the case of maximization):

By finding the $BSC_k$ so that if the $BSC_j$ is a possible Base Station Combination that does not break a given restriction and $f(BSC_k) \geq f(BSC_j)$ holds true, then one optimizes a given objective BSC function, $f:BSC \to \Re$. Therefore, the Base Station Combination can be expressed as SYSTEMSTATE as detailed in following explanation.

In a multicast cell (c) and for a given service (s), there exists a multicast bias (MB or threshold). For example, the bias may depend on factors such as power control in an UMTS. Broadcast cells (e.g., DVB-T/X) can be likened to multicast cells having a multicast bias of one user. In the cells capable of transmitting only unicast (e.g., WLAN) services, the multicast bias can be considered infinite. Or more simply stated, In broadcast networks the multicast bias equals 1, and in unicast networks it the multicast bias is infinite. As such, the multicast bias for a given multicast cell and service may be represented as MB(c, s). If at least as many users request the same service in a multicast cell coverage area as defined in a given multicast bias/threshold, then the cost to send one multicast stream to all these users is equal to sending MB(c, s) unicast streams to the receivers. Thus, if the number of users is in the given cell (c) is greater than the number specified for the given multicast bias/threshold, then adding new users to receive the given multicast service (s) does not increase system costs.

In the situation where cells of one network do not overlap, the terminals are connected to one BS/RAN. In the case of distinct cells, one cell (c) can be examined as an independent entity. The state of each service (s) in each cell (c) may be stated as:

$$STATE(c,s) = (k_{cs1}, k_{cs2}, \ldots, k_{csn})$$

Where, (n) is the number of users requesting service (s) in the cell (c) coverage area. Where, $k_{csu}=1$ if the USER(c, s, u) receives service (s) stream from the cell (c), otherwise $k_{csu}=0$. And where, USER(c, s, u)=i indexes the above by any user (u) in the system requesting the service (s) in the cell (c) area.

Thus, the state of the entire system may now be expressed as a combination of all cell and service states defined above. In one embodiment, it may be implemented by using a 3-dimensional table. The combination may be expressed as:

$$SYSTEMSTATE = \bigotimes_{c,s} STATE(c, s,)$$

The above having the following condition for each user i:

$$\Sigma k_{csu} \leq 1, \text{ where } USER(c, s, u) = i$$

In other words, each state of the system tells which users in each cell area receive service from that cell, with the condition that each user receives at most one service stream from the system. If the amount of 1's in the STATE(c, s) $\geq$ MB(c, s), then the cell is multicasting (or possibly broadcasting) the service, otherwise there are only unicast streams.

Other restrictions may be added. For example, restrictions may be set by the network as to capacity and QoS requirements. In one embodiment, a cell capacity restriction is taken into account in the NSA as follows:

SYSTEMSTATE is a feasible solution only if for each cell (c) the following holds:

$$\sum_{s=1}^{S} SERVCAP(c, s) \min\left\{\sum_{u=1}^{n_s} k_{csu}, MB(c, s)\right\} \leq CAPACITY(c)$$

Where (s) is any service. Where SERVCAP(c, s) denotes capacity consumed by service (s) when transmitted via cell (c). Where $(n_s)$ indicates the number of users requesting service (s) in cell (c) coverage area. Where CAPACITY(c) expresses a limit on the capacity to provide service streams for or each cell (c), wherein each service stream occupies some specified portion of that capacity. More simply stated, CAPACITY(c) is the usable capacity in the cell (c).

In other words, there must be enough capacity in cells CAPACITY(c) to provide the service streams defined in the SYSTEMSTATE. With regard to the minimization, if the number of users receiving service is equal to or greater than the multicast bias, then a multicast group is formed and capacity allocated for it. Each cell must have enough capacity to provide transmitted services through it.

Accounting for Dynamic Network Changes

Of course network activity can change over time. Terminals move in and out of a given area. Terminals joining and resigning from service flows affect cell capacities dynamically. Depending on network conditions, recalculating the objective function value may or may not be necessary for each terminal entering or leaving the system. Such recalculation may be particularly questionable when theretofore the NSDHN may have reached a near optimal solution. In one embodiment, whenever a small change in the system configuration occurs, the algorithm is run for a short time starting from the solution of the previous position. Such an embodiment allows the NSDHN to adapt to the new situation and further optimize communications. This is called as local optimization in time. Further alternative embodiments exist.

In another embodiment, a terminal may join a service by telling the system it wants to receive a service stream from any of the base stations covering the area in which the terminal resides.

In another embodiment, the terminal may resign from a service by informing that it no longer requires the service. In the case where the disconnection is performed by the NSDHN, resigning does not add any extra penalty term when the objective function is calculated in the next time frame.

In another embodiment, the terminal may change its position in the area and possibly move into another cell coverage area. In that case, a unicast data transmission from the original bearer should be terminated and a new unicast service stream should be initiated or the terminal should be added to an existing multicast or broadcast stream by the NSA, if possible.

In another embodiment, tries to find an optimal solution, which may be a capacity lower than the 'nominal.' Each cell (RAN) can be thought to have a 'nominal' capacity, which is determined externally and may change with time. Varying the nominal cell capacity further leads to two different scenarios. If the nominal capacity is increased, nothing special has to be done. However, if the nominal capacity is to be decreased, alternative approaches exist. In the first capacity decreasing approach, nominal capacity cannot be reduced until some terminals in the cell area resign from any service transmitted by that cell. Alternatively, if nominal capacity is decreased by the system as required by established restrictions, then some of the terminals listening to any transmitted services must be dropped within the given cell until capacity restrictions are not being violated. In each case, the nominal capacity changes can implemented independently of other cells.

Regardless of which alternative is employed, such dynamic network changes begin with taking a cell and a service stream requested in its area and deciding, whether capacity should be increased or decreased for the service. For purposes of illustration, the following transition discussion is framed in terms of stationary scenarios. A dynamic case can be considered as a row of stationary situations, and each stationary situation can have an initial positioning inherited from (possibly a slightly modified) solution of the previous stationary situation.

To reduce the complexity, if a multicast group has already been created, then there is no need to create a new service stream for users in a multicast cell area via other networks. As such, with a set cost of transmitting a service to a multicast group, all the users that request the service in the cell area may be served. Broadcast cells can be considered as a special case of multicast cells having a multicast threshold of one user. In the cells capable to transmit only unicast services, the multicast threshold is infinite.

It should be noted that for every instant of time, the NSDHN uses an algorithm seeking an optimal solution. Searching for a new more optimal solution takes place whenever a change occurs (e.g., users joins or leaving a service, or move into or out of the area, etc.) in network. The NSDHN iterates and experiments in seeking out a new more optimal solution by increasing or decreasing the capacity. Such iteration takes place when the situation is static (i.e., when no such changes are taking place in the network. As such, f the network is a broadcast network, the state transition resulting from the algorithm is as follows. In any broadcast cell, the service is either on or off for all the users. So the only thing to be done is to make sure the service is on if capacity is decided to increase and capacity limitations allow, or off in the case of decreasing capacity.

In the case of a single unicast network and its cells, then the state transition resulting from the algorithm is as follows. Because all users in one unicast cell receive different service transmissions, the NSDHN finds any user for whom to try to add or reduce capacity according to the decided transition direction. The new state is otherwise the same as the earlier one, except if cell capacity limitations allow, then the user being considered gets a new stream or, alternatively, the user loses its old service stream.

Finally, in the case of a multicast capable network, there may be at most MB (c, s)-1 unicast streams of service (s) in the cell (c) area. If there were more than MB(c, s)-1 users, then using a multicast group would become a more efficient delivery option than using several different unicast transmissions. At more than MB(c, s)-1 users, the NSDHN can support all the users receiving unicast streams in the cell area, instead, with a multicast stream for the collective group; at such a point, the NSDHN will support the multicast transmission to that number of users equally well and at the same cost. Therefore a notable deduction is as follows: if a multicast stream of service (s) is transmitted in cell coverage area (c), then each user requesting service (s) in that area must receive service (s), either from cell (c) or any other cell in that area.

As such, the dynamic network state transitions occur as follows: (1) if it is decided that used capacity should be diminished, then the NSDHN tries either (2) to remove one of the unicast flows or (3) close the multicast group and start MB(c, s)-1 unicast transmission flows for the desired users. Correspondingly, (4) if it is decided to add used cell capacity, then (5) the NSDHN adds one unicast stream in the case where there is at most MB(c, s)-2 unicast streams that are on, or (6) the NSDHN uses one multicast stream instead of MB(c, s)-1 unicast streams. Both broadcast and unicast cells can be represented as special cases of multicast cells. Changing a multicast stream into several unicast streams transmitted by the same cell does incur an extra penalty term for the system.

Overlapping Coverage Areas and Dynamic Network Changes

Figure 3:
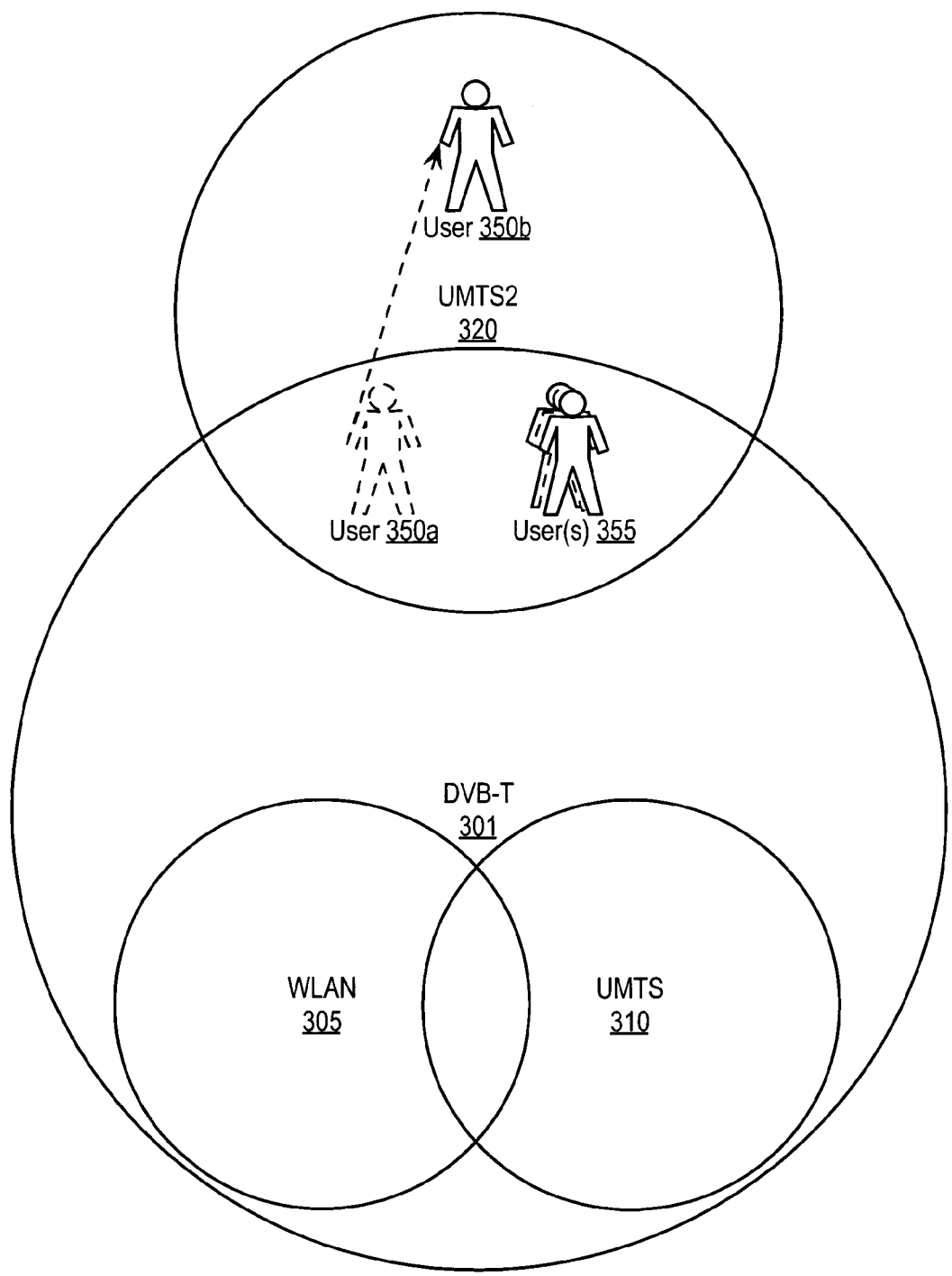
FIG. 3 is of a topology diagram illustrating one embodiment where the NSDHN may be employed with overlapping cell areas.

In addition to the above discussion, the possibility of overlapping cells can further complicate matters. FIG. 3 illustrates one embodiment environment where the NSDHN may be employed with overlapping cell areas. In the case of overlapping cell areas, if the NSDHN turns the service off in a cell, this does not affect other cells. However, in a case where the NSDHN creates a new service transmission flow, the NSDHN should check whether users belonging to this new flow are receiving the data from other cells. It should be noted that for purposes of illustration, the following discussion concentrates on the situation where there is one broadcast 301, one multicast 310 and one unicast 305 network. However, considering a case of only two or more overlapping multicast cells would suffice because other bearing mechanisms are only special cases of multicasts.

In the case where there is one large DVB-T (broadcast) cell 301 covering the whole area and smaller UMTS (multicast) 310 and WLAN (unicast) 305 cells, three (3) heuristics are added on top of such a scenario:

(1) If the NSDHN starts a DVB-T 301 service stream, then it can stop the service transmission in the other cells 305, 310, because it would not make any sense to have any other streams of the same service.

(2) If the NSDHN starts a WLAN service stream 305, it can stop the service transmission in the DVB-T 301 or UMTS 310 cell, i.e., stopping whichever was serving the stream before. As such, the NSDHN can turn a multicast stream into MB(c, s)-1 unicast service streams, if either of these service streams 301, 310 were on.

(3) Finally, if the NSDHN starts a new UMTS 310 service stream, then it can stop the service transmission in the DVB-T 301 cell. As such, if any of the terminals that will become a member of the newly starting UMTS 310 (possibly multicast) service stream were receiving a WLAN transmission earlier, then the NSDHN can turn those WLAN 305 (unicast) service streams off. These heuristic modifications are implemented to increase efficient eliminating the case where broadcast, multicast and/or unicast transmissions might be used for the same coverage area of a multicast cell.

In general, the NSDHN cannot always turn off the multicast service stream in a multicast cell. This can occur in the situation where one user 350a, who has earlier received data from a stream 301, decides to move 350b to a data stream transmitted by another cell 320. In that case, the NSDHN might never achieve the optimal solution in some situations where two multicast cells of two different types overlap and each cover users 355 that the other does not cover 350b. Leaving the multicast service stream on in these instances makes the NSA execute only marginally slower.

Expressing State Transitions

Based on the foregoing dynamic network change discussions, state transitions for the NSDHN may be expressed as follows:

First, the NSDHN chooses a cell (c) and a requested service (s) in the coverage area. Then the NSDHN decides whether to add or reduce capacity allocated to that service.

Reducing Coverage Area Capacity

In the case where the NSDHN decides to reduce capacity, state transition may be expressed as:

If $STATE(c, s) = (k_{cs1}, k_{cs2}, \ldots, k_{csn}') \neq (0,0, \ldots, 0)$,
then the NSDHN chooses a $k_{csu}$ such that $k_{csu} = 1$.

The resulting modified state of that cell and service may be denoted as $STATE'(c,s) = (k_{cs1}', k_{cs2}', \ldots, k_{csn}')$.

The newly reduced state may be expressed as follows:
Thus, where $$\sum_{u=1}^{n} k'_{csu} \geq MB(c, s),$$

then the NSDHN chooses a $k_{csu}' = 1$ and set that $k_{csu}' = 0$.

In other words, if capacity is being reduced, then turn-off possible multicast (or broadcast) transmissions and change the state to have MB(c, s)-1 unicast transmission streams. Or, if a multicast group had not been formed, then turn off one unicast stream.

Increasing Coverage Area Capacity

In the case where the NSDHN decides to increase capacity, state transition may be expressed as:

If $STATE(c,s) = (k_{cs1}, k_{cs2}, \ldots, k_{csn}) \neq (1,1, \ldots 1)$,
then the NSDHN chooses a $k_{csu}$ such that $k_{csu} = 0$.

The resulting modified state of that cell and service may be denoted as $STATE'(c,s) = (k_{cs1}', k_{cs2}', \ldots, k_{csn}')$.

Thus, where $$\sum_{u=1}^{n} k'_{csu} \geq MB(c, s),$$

then the NSDHN sets the new state $STATE'(c,s) = (1,1, \ldots, 1)$.

Finally, for all users i receiving the service stream (s) from cell (c), the NSDHN sets states in the other cells so that $k_{c_2 su} = 0$, where ($c_2$) is any cell other than (c) and $USER(c_2, s, u) = i$.

In other words, when one user is added to the system and if the multicast bias has been reached, then all users are allowed to receive the service from this cell. Concerning other cells, we must make sure that users now receiving data from the cell considered do not receive any other streams.

Encouraging Optimality

To be sure that combining several different networks does not give worse results than using any of these networks alone, the NSDHN first determines how well it can serve users with each of these networks alone. These results are combined later to get a starting position for the NSA as follows:

Users that can receive service from a broadcast (e.g. DVB-T or digital video broadcasting—handheld (DVB-H)) cell are initially positioned in that cell. Then remaining users are serviced primarily via multicast (e.g., UMTS) cells. Finally, for users not yet assigned to one of the above cell types, they will receive the requested service transmitted via a unicast (e.g., WLAN) network (assuming those users are able to receive the service in the bare unicast case). If the initial position is acquired with the explained procedure, at least as many users will likely receive the required service as in the case of the best single network situation.

The NSDHN can use the solution of the previous situation as a starting point for the next scenario, which is run only a few iteration rounds. The scenario does not change very much in a short time frame, so local optimization starting from the previous solution is a fast method to find a reasonably good solution. To be able to run local iteration runs, the NSDHN modifies the previous solution to answer the new scenario problem. This can be done by removing the streams that are not applicable any more in the changed situation as has already been discussed. In another embodiment, the simulation may be re-executed from the very beginning. Small changes in the scenario accumulate and move the global optimum to a point that cannot otherwise be achieved by successive short local optimizations, however, the NSDHN can always reach the global optimum with a longer iteration starting from the beginning.

In a short amount of time, the scenario probably does not change much, therefore, the NSDHN may employ short local optimization rounds for a relatively long time, but at some intervals we should also run the algorithm starting from zero. These two mechanisms complement each other.

General Annealing Algorithms

In physics, simulation algorithms based on Monte Carlo simulations have been introduced. In one of such algorithms, an atom is given a small random displacement and the resulting change in the energy of the system is computed. If the total energy decreases, the displacement is accepted, and the new configuration is used as a starting point for the next step. If the energy increases, the new configuration is accepted by an exponential probability that depends on the temperature T and the difference of energy ΔE, which can be expressed as:

$$P(\Delta E) = e^{-\Delta E/T}$$

Finding the low-temperature state of system can be likened to the combinatorial problem of optimizing a hybrid network. The physical annealing may be successfully modeled in a computer simulation. Although, the concept of physical temperature has no obvious equivalent in the abstract network system being optimized, one can anyhow carry out a Simulated Annealing process by introducing an effective pseudo-temperature in order to obtain a good heuristic solution for a hybrid network combinatorial optimization problem.

Thus, by using the cost function in place of energy and defining configurations by a set of parameters, the NSDHN may generate a population of configurations and then apply simulated annealing to solve a given optimization problem using a control parameter instead of some effective pseudo-temperature.

Thus, the NSDHN may simulate annealing by analogizing the physical annealing simulation with that of the hybrid network optimization as follows. First, by "melting" the system being optimized at a "high temperature," and then "lowering" the "temperature" slowly, the NSDHN can determine each "temperature" by annealing long enough for the system to reach a steady state. The sequence of temperatures and the number of rearrangements attempted to reach equilibrium at each temperature can be considered an annealing schedule.

In other words, the NSDHN may first, by setting the costs of a hybrid network to be high, and then lower the cost function results slowly. For example, an optimum solution may uncovered by using the same cost function and comparing the results from different rearrangements. As such, the NSDHN can determine each set of costs by annealing long enough for the system to reach a steady state. The steady state will approach and/or achieve optimization of costs. The sequence of values for cost function and the number of rearrangements attempted to reach equilibrium at each rearrangement can be considered an annealing schedule. It should be noted that any of the aforementioned control parameters may be used (e.g., maximizing spectrum efficiency, load balancing, accessibility, etc.); the NSDHN is not limited to simulating annealing to optimizing costs.

Simulated Annealing

In the case of cost minimization, the Simulated Annealing algorithm may be expressed as follows:

```
obtain an initial solution (S) and an initial control parameter T
while (stop criterion not satisfied) {
    while (inner loop criterion not satisfied) {
        select a neighbor S' of S
        Δ = cost(S') − cost(S)
```

-continued

```
        if (Δ ≤ 0) S = S'
        else S = S' with probability e^{−Δ/T}
    }
    reduce T
}
```

Thus in practice, $e^{-\Delta/T}$ is accepted some portion of the cases, and rejected otherwise. With regard to the probability $e^{-\Delta/T}$, if the cost associated with the new solution is higher than the cost associated with the old solution, then the probability is calculated. If this probability is greater than a random number (Ran) between 0.0 and 1.0, then this new solution is accepted and becomes the starting point for the next iteration. Conversely, if the probability $e^{-\Delta/T}$ is less than Ran, then the new solution is rejected and the current solution stays the same and is used in the next iteration.

Pseudo-Algorithm to Optimize Hybrid Network Datacasting

In one embodiment, a Metropolis network selection (pseudo-algorithm) may be used to optimize for hybrid network datacasting control parameters may be expressed as follows:

```
initialize S to null
while (any terminal in the scenario exists) {
    if (a change in the scenario happens) {
        /* Network Selection Metropolis Algorithm: */
        get an initial solution S inherited from the solution of
the previous situation and an initial control parameter **T (i.e., a pseudo-
temperature)
        while (T > 0) {
            while (iterations done < iterations to be done) {
                select a cell, a service and whether to
***add or reduce capacity, and
                denote that state with S'
                Δ = cost(S') − cost(S)
                if (Δ ≤ 0) S = S'
                else S = S' with probability e^{−Δ/T}
            }
            reduce T
        }
    }
    if (enough iterations done) {
        initialize S to null
        run the Network Selection Metropolis algorithm from the
very beginning
    }
}
```

**T is proportional to the maximum value of the objective function.
***As described earlier, see "Reducing Coverage Area Capacity" and "Increasing Coverage Area Capacity."

It is of note that in the exemplary algorithm, the objective function values are calculated very fast. The reason for the fast calculation is that most of the time is spent executing the (Metropolis) algorithm, which is extremely computationally efficient. As already mentioned, the objective function could be based any number of parameters (e.g., on number of service receiving users, economical issues, etc.).

Genetic-Algorithm to Optimize Hybrid Network Datacasting

An alternative optimization for hybrid network datacasting is one that likens all terminals in a hybrid network to a genes' position in a sequence. Thus, an optimization is determined for each base station to transmit the required service for the terminals in question. So in such an embodiment, each terminal points to a base station (or no base station at all).

Although it is difficult to express a hybrid network optimizer in genetic terms, a genetic-algorithm to optimize for hybrid network datacasting control parameters may be expressed as follows:

Each possible solution (x) can be presented as $$x=(b_1, b_2, \ldots, b_n)$$

Where (n) represents the number of terminals in an area. Where ($b_i$) represents a given base station (which is possibly non-existent, i.e., null) through which terminal (i) is communicating. In other words, solution (x) evaluates from which base station ($b_i$) each terminal (i) receives its data.

Therefore two solutions (which may be likened to parents) may then be combined to produce a new solution (which may be likened to offspring). Further, for each terminal, a base station may be randomly 'inherited' from each of the 'parents.' This may be expressed as follows:

for each terminal $i$ in the new (offspring) solution
  {$b_i$=randomly ($b_{i_1}$ or $b_{i_2}$)}

Where $b_{i_u}$ is the parent (u) solution base station (b) for terminal (i).

Each STATE(c, s) may now be expressed as follows:

$$STATE(c,s)=(k_{cs1}, k_{cs2}, \ldots, k_{csn})$$

Where $k_{csu}$=1, if USER(c, s, u)=i and $b_i$=c, Otherwise $k_{csu}$=0.

Base stations may also be changed randomly at some low rate. The random change of the base station can be considered likened to a mutation and expressed as follows:

```
mutate(individual x = (b_1,b_2,...,b_n)) {
    randomly(select i = 1,..., n)
    b_i = randomly(any base station B such that x ∈ COV(B, t), or null)
}
```

Where (t) is an instant of time. Here, a solution selects a randomized base station $b_i$ that is either a member of a set of covering base stations B at time (t), or non-existent.

In one embodiment, the parents' value measured by the objective function is better than the offspring, then those values may be reused in subsequent iterations. During various test runs, the following parameters yield good results. The example tests were run employing 100 individuals for each population. A 'mutation' rate was set to start from 0.001 and decreased to zero during the algorithm execution. In each execution round, the 30 best individuals of each round were combined to produce offspring. In one embodiment, execution ceases, for example after 1000 rounds, if the best solution does not get any better or if a feasibly good solution has been found. The algorithm may be stopped also due to calculation time restrictions, or due to a number of entries and exits within a predefined time period. Alternatively, the algorithm may be stopped when the differential improvement per round decreases so as to become marginal and not worth further processing time.

As such, the genetically likened alternative optimization for hybrid network datacasting may be expressed as follows:

```
randomly generate an initial population P of possible solutions b = (b_1,b_2,...,b_n)
    while (getting better solutions in population P within a few rounds) {
        mutate(some individuals b in P)
        for (each new offspring z in P to be created)
            combine(solutions x and y in P) {
                for each terminal i in z
                    inherit a base station b_i from either parent
            }
            drop solutions that break restrictions
            check fitness of each new solution z with objective function
f and choose the next generation P
    }
```

To ensure that combining several different networks does not give worse results than using any of these networks alone, the NSDHN first simulates how well its various network communications bearers can serve users with each of these single networks. These results are later to be combined to get a starting position to the simulation as follows as was already discussed above with regard to "Encouraging Optimality," wherein users are assigned to broadcast cells, then multicast cells, and last to unicast cells.

EXAMPLE HYBRID NETWORK ENVIRONMENT

Figure 4:
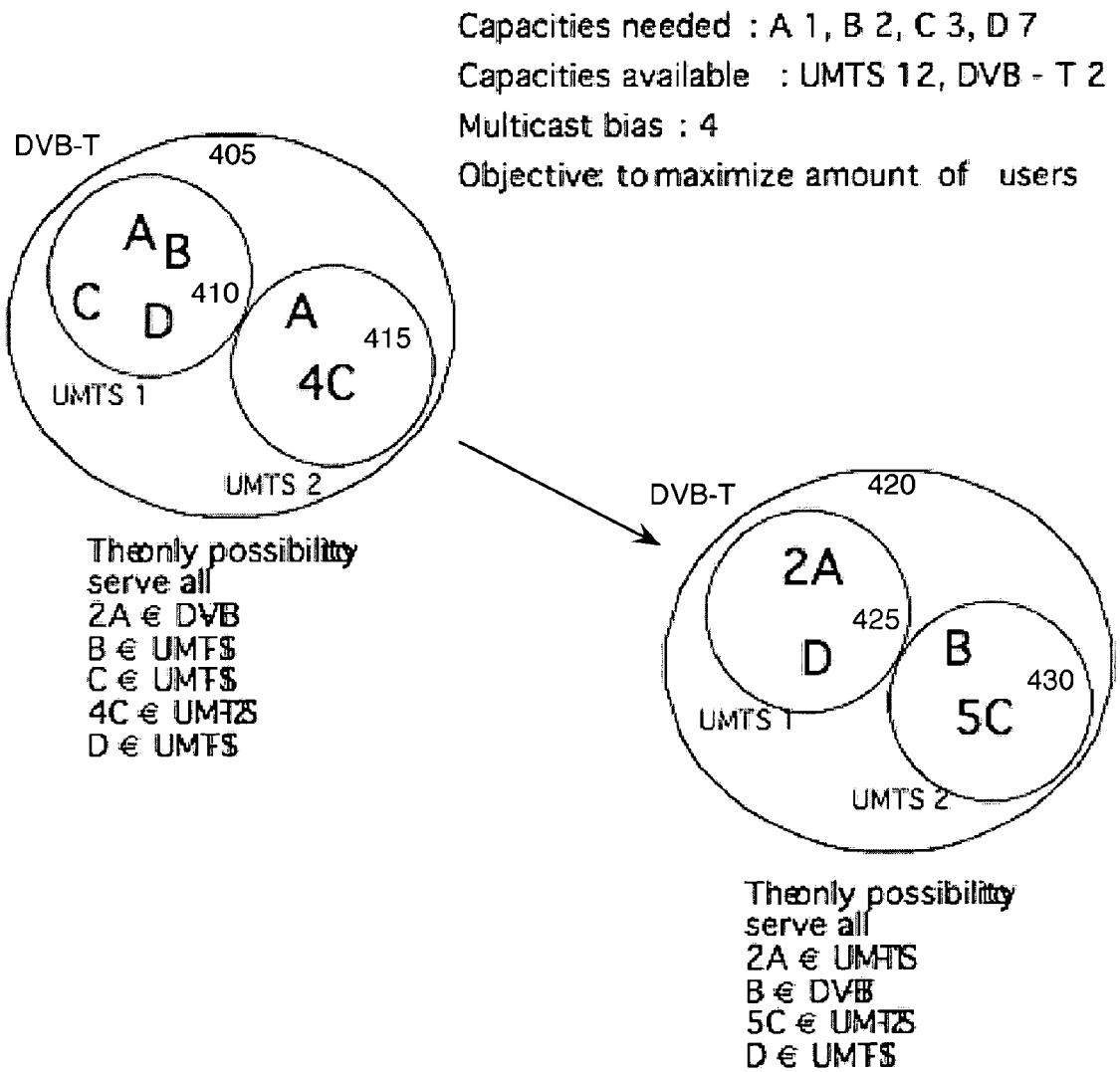
FIG. 4 is of a topology diagram illustrating one embodiment where the NSDHN is employed as users move throughout a cell area.

FIG. 4 illustrates one embodiment environment where a network selector for datacasting in hybrid networks (NS-DHN) may be employed. In this environment, the NSDHN achieves more optimized service switching. In this example topology, user terminals exist and are requesting datacasts A, B, C, and D. Three cell coverage areas are provided where a DVB-T 405, 420 region circumscribes two non-overlapping UMTS areas (UMTS1 410, 425 and UMTS2 415, 430). The service capacities of the network cells are given as follows: UMTS supports 12 datacast units, and DVB-T supports 2 datacast units.

Service A requires 1 capacity unit, service B 2 units, service C 3 units and service D 7 units. Multicast bias is 4 for all cells and services. Our objective is to maximize the number of data receiving users.

In the scenario of service distribution at time 1 as shown by the various services A,B,C, and D circumscribed in the service DVBT 405, the only possibility to serve all users is to transmit service A by DVB-T 405 cell and services B, C and D by UMTS 410 cells. The reason for this is if all users requesting service C are to be served, data is must be transmitted from UMTS-2 415 cell, because the DVB-T cell does not have enough capacity for service C. User that requests service A in the same cell area must then to be served by the DVB-T cell. For users requesting services B, C and D in the UMTS-1 410 cell area, there is not enough capacity left in the DVB-T cell, so they must be served by the UMTS-1 cell, the capacity of which is then totally used. Finally, user that requests for service A in the UMTS-1 cell area receives his service from the DVB-T cell.

The situation becomes a little bit different when three users change their position as represented at time 2 and circumscribed in the DVBT service area 420. At time 2, service A has to be switched to UMTS 425 network and service B to DVB-T 420 network in order to serve all users successfully. Therefore, all service C users must be served by the UMTS-2 430 cell. They can form a multicast group, which can serve all five users for cost of four because there are more users than the multicast bias (i.e., 4). The user requesting service B must be served by the DVB-T 420 cell. The only cell having any capacity left for the rest users is the UMTS-1 425 cell, therefore, services A and D can be transmitted by that cell. This short example shows that even in small cases the user positioning affects a lot to the service grouping between different networks.

Whenever a small change (a terminal moves, capacities change or a terminal joins or resigns a service) in the scenario occurs, the algorithm is run for a short time beginning from the previous solution. This leads to the fact that small changes do not affect the solution drastically. However, in an alternative embodiment, periodically, the algorithm may be run from the very beginning to find better solutions.

Terminal Battery Life Extension

One example application of the NSDHN is to extend battery life for terminals. As new terminal devices are increasingly equipped with more than one radio access technology (e.g., GPRS, WLAN, etc.), such capabilities allow the NSDHN to select the best transmission route from among different radio access networks for such terminals. The battery life of a terminal is a key element. If the standby or talk time is short, it will have a negative impact on users' experiences. The NSDHN can increase the standby time of terminal by efficiently selecting the network so the battery does not need to be charged so often. As such, the NSDHN provides a novel way in which to extend terminal battery life by minimizing the receiver power consumption of a terminal in hybrid networks.

For example, the NSDHN's objectives and/or restrictions may be established to optimize a terminal's power consumption when it is transmitting and/or receiving in a given area. The NSDHN will decrease battery power consumption in terminals by routing them to a bearer that requires less power consumption to communicate. With such support for power consumption optimization, data delivery can be performed over a selected optimal access system. The selection of an access system may depend on a number of factors such as: number of simultaneous recipients, required QoS, QoS capabilities in the access systems, user preferences, and terminal capabilities. In the scenario where all different networks are equal with regard to such factors, then the selection can be made based on power consumption for a terminal. For example, the IP multicast data transfers to mobile terminals 140, 150, 155 of FIG. 1 are performed over a network selection router 115 and the access systems 120, 130, 135. This router routes the data so that receivers' power consumption is minimized. Where terminals are able to receive data via different access systems, the data requested by a terminal is then routed via an access system that consumes less power in the terminal. For example, terminal 150 may be routed from the UTMS bearer 130 to the RAN 120 bearer. The selection system 105 maintains a database, which collects information about battery power consumption from the terminals. The database can be based on real-time measurements or it can be pre-defined. For users that are willing to receive multicast data, the selection system optimizes the overall power consumption among terminals.

In an alternative embodiment, the power consumption of the terminal can be decreased by receiving the data at a lower bitrate. Most terminals can receive data at a variety of bitrates. The lower bitrates may be associated with other levels of QoS. The decision to provide a selected one or a plurality of bitrates may depend on the inputs to the DME.

Network Selector for Datacasting in Hybrid Networks Controller

Figure 5:
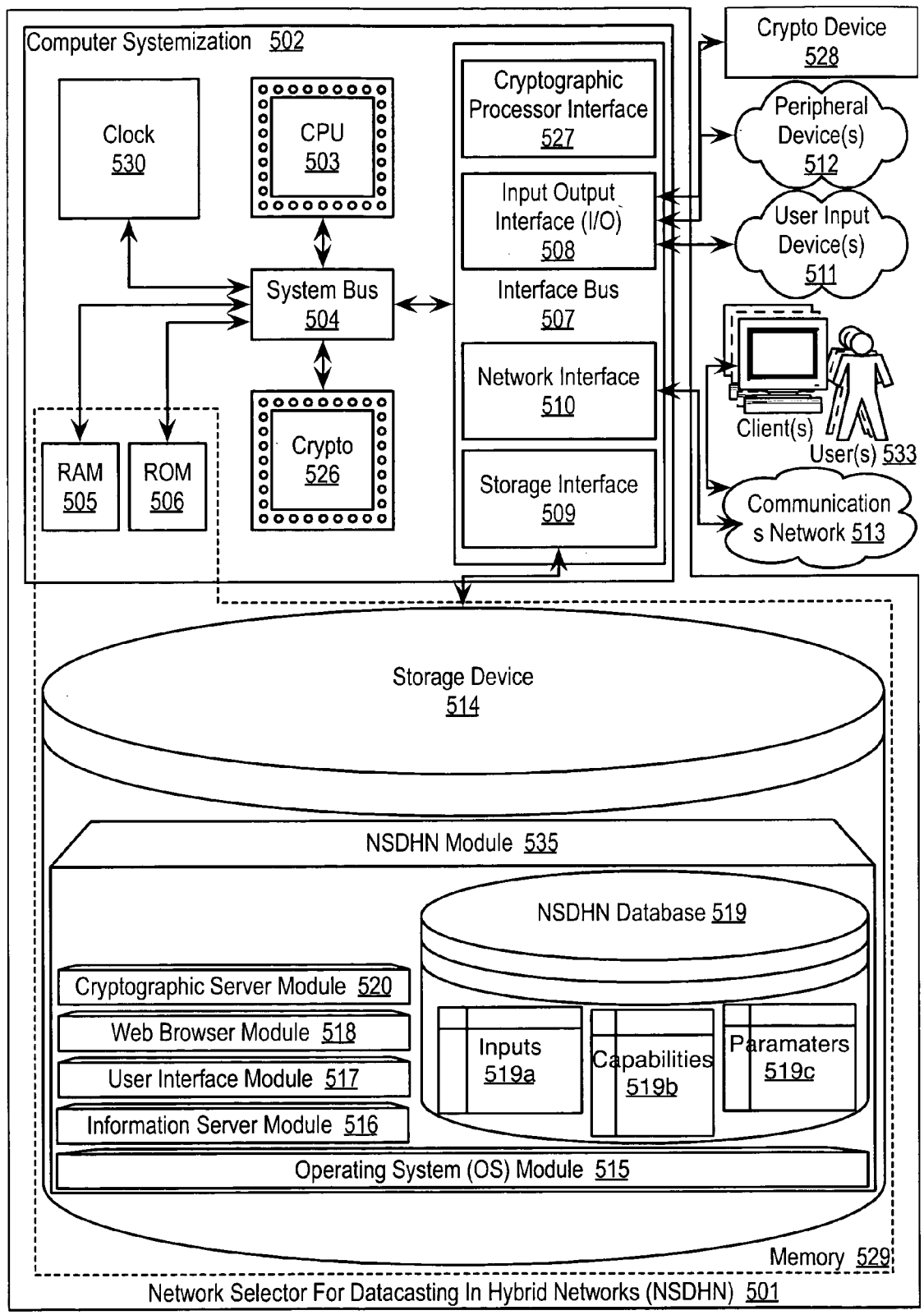
FIG. 5 is of a block diagram illustrating one embodiment of an network selector for datacasting in hybrid networks controller.

FIG. 5 illustrates one embodiment incorporated into an network selector for datacasting in hybrid networks (NS-DHN) controller 501. In this embodiment, the NSDHN controller 501 may serve to process, store, search, identify, instruct, generate, match, and/or update optimal configurations for datacasting across various communication networks.

In one embodiment, the NSDHN controller 501 may be connected to and/or communicate with entities such as, but not limited to: one or more users from user input devices 511; peripheral devices 512; and/or a communications network 513. The NSDHN controller may even be connected to and/or communicate with a cryptographic processor device 528.

An NSDHN controller 501 may be based on common computer systems that may comprise, but are not limited to, components such as: a computer systemization 502 connected to memory 529.

Computer Systemization

A computer systemization 502 may comprise a clock 530, central processing unit (CPU) 503, a read only memory (ROM) 506, a random access memory (RAM) 505, and/or an interface bus 507, and most frequently, although not necessarily, are all interconnected and/or communicating through a system bus 504. Optionally, a cryptographic processor 526 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as AMD's Athlon, Duron and/or Opteron; IBM and/or Motorola's PowerPC; Intel's Celeron, Itanium, Pentium and/or Xeon; and/or the like processor(s). The CPU interacts with memory through signal passing through conductive conduits to execute stored program code according to conventional data processing techniques. Such signal passing facilitates communication within the NSDHN controller and beyond through various interfaces.

Interface Adapters

Interface bus(ses) 507 may accept, connect, and/or communicate to a number of interface adapters, conventionally although not necessarily in the form of adapter cards, such as but not limited to: input output interfaces (I/O) 508, storage interfaces 509, network interfaces 510, and/or the like. Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), Personal Computer Memory Card International Association (PCMCIA), and/or the like.

Storage interfaces 509 may accept, communicate, and/or connect to a number of storage devices such as, but not limited to: storage devices 514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 510 may accept, communicate, and/or connect to a communications network 513. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, composite, digital, Digital Visual Interface (DVI), RCA, S-Video, VGA, and/or the like; wireless; and/or the like. A common output device is a video display, which typically comprises a Cathode Ray Tube (CRT) or Liquid Crystal Display (LCD) based monitor with an interface (e.g., DVI circuitry and cable) that accepts signals from a video interface. The video interface composites information generated by a computer systemization and generates video signals based on the composited information in a video memory frame. Typically, the video interface provides the composited video information through a video connection interface that accepts a video display interface (e.g., a DVI connector accepting a DVI display cable).

User input devices 511 may be card readers, dongles, finger print readers, gloves, graphics tablets, joysticks, keyboards, mouse (mice), trackballs, trackpads, retina readers, and/or the like.

Peripheral devices 512 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, visors, and/or the like.

It should be noted that although user input devices and peripheral devices may be employed, the NSDHN controller may be embodied as an embedded, dedicated, and/or headless device, wherein access would be provided over a network interface connection.

Cryptographic units such as, but not limited to, microcontrollers, processors 526, interfaces 527, and/or devices 528 may be attached, and/or communicate with the NSDHN controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 529. However, memory is a fungible technology and resource, thus, any number of memory embodiments may be employed in lieu of or in concert with one another. It is to be understood that an NSDHN controller and/or a computer systemization may employ various forms of memory 529. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 529 will include ROM 206, RAM 505, and a storage device 514. A storage device 514 may be any conventional computer system storage. Storage devices may include a drum; a (fixed and/or removable) magnetic disk drive; a magneto-optical drive; an optical drive (i.e., CD ROM/RAMRecordable (R), ReWritable (RW), DVD R/RW, etc.); and/or other devices of the like. Thus, a computer systemization generally requires and makes use of memory.

Module Collection

The memory 529 may contain a collection of program and/or database modules and/or data such as, but not limited to: operating system module(s) 515 (operating system); information server module(s) 516 (information server); user interface module(s) 517 (user interface); Web browser module(s) 518 (Web browser); database(s) 519; cryptographic server module(s) 520 (cryptographic server); NSDHN module(s) 535; and/or the like (i.e., collectively a module collection). These modules may be stored and accessed from the storage devices and/or from storage devices accessible through an interface bus. Although non-conventional software modules such as those in the module collection, typically, are stored in a local storage device 514, they may also be loaded and/or stored in memory such as: peripheral devices, RAM, remote storage facilities through a communications network, ROM, various forms of memory, and/or the like.

Operating System

The operating system module 515 is executable program code facilitating the operation of an NSDHN controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh Os, Microsoft DOS, Palm OS, Windows 2000/2003/3.1/95/98/CE/Millenium/NT/XP (Server), and/or the like. An operating system may communicate to and/or with other modules in a module collection, including itself, and/or the like. Most frequently, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. The operating system may provide communications protocols that allow the NSDHN controller to communicate with other entities through a communications network 513. Various communication protocols may be used by the NSDHN controller as a subcarrier transport mechanism for interaction, such as, but not limited to: multicast, TCP/IP, UDP, unicast, and/or the like.

Information Server

An information server module 516 is stored program code that is executed by the CPU. The information server may be a conventional Internet information server such as, but not limited to Apache Software Foundation's Apache, Microsoft's Internet Information Server, and/or the. The information server may allow for the execution of program modules through facilities such as Active Server Page (ASP), ActiveX, (ANSI) (Objective-) C (++), Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an HTTP request is resolved to a particular information server, the information server resolves requests for information at specified locations on a NSDHN controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other modules in a module collection, including itself, and/or facilities of the like. Most frequently, the information server communicates with the NSDHN database 519, operating systems, other program modules, user interfaces, Web browsers, and/or the like.

Access to NSDHN database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the NSDHN. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the NSDHN as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program module, system, user, and/or data communications, requests, and/or responses.

User Interface

A user interface module 517 is stored program code that is executed by the CPU. The user interface may be a conventional graphic user interface as provided by, with, and/or atop operating systems and/or operating environments such as Apple Macintosh OS, e.g., Aqua, Microsoft Windows (NT/XP), Unix X Windows (KDE, Gnome, and/or the like), and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A Web browser module 518 is stored program code that is executed by the CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program modules through facilities such as Java, JavaScript, ActiveX, and/or the like. Web browsers and like information access tools may be integrated into PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from NSDHN enabled nodes. The combined application may be nugatory on systems employing standard Web browsers.

NSDHN Database

An NSDHN database module 519 may be embodied in a database and its stored data. The database is stored program code, which is executed by the CPU; the stored program code portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the NSDHN database may be implemented using various standard data-structures, such as an array, hash, (linked) list, struct, structured text file (e.g., XML), table, and/or the like. Such data-structures may be stored in memory and/or in (structured) files. If the NSDHN database is implemented as a data-structure, the use of the NSDHN database may be integrated into another module such as the NSDHN module. Databases may be consolidated and/or distributed in countless variations through standard data processing techniques. Portions of databases, e.g., tables, may be exported and/or imported and thus decentralized and/or integrated. In one embodiment, the database module 519 includes three tables 519a-c. An inputs table 519a includes fields such as, but not limited to: inputs as mentioned in table 1, and/or the like. A capabilities table 519b includes fields such as, but not limited to: a terminal's capabilities, a base station's capabilities, a network bearer's capabilities, and/or the like. A parameters table 519c includes fields such as, but not limited to: spectrum efficiency values, mapping parameters, and/or the like. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database modules 519a-c. The NSDHN may be configured to keep track of various settings, inputs, and parameters via database controllers.

An NSDHN database may communicate to and/or with other modules in a module collection, including itself, and/or facilities of the like. Most frequently, the NSDHN database communicates with an NSDHN module, other program modules, and/or the like. The database may contain, retain, and provide information regarding other nodes and data.

Cryptographic Server

A cryptographic server module 520 is stored program code that is executed by the CPU 503, cryptographic processor 526, cryptographic processor interface 527, cryptographic processor device 528, and/or the like. Cryptographic processor interfaces will allow for expedition of encryption and/or decryption requests by the cryptographic module; however, the cryptographic module, alternatively, may run on a conventional CPU. The cryptographic module allows for the encryption and/or decryption of provided data. The cryptographic module allows for both symmetric and asymmetric (e.g., Pretty Good Protection (PGP)) encryption and/or decryption. The cryptographic module may employ cryptographic techniques such as, but not limited to: digital certificates (e.g., X.509 authentication framework), digital signatures, dual signatures, enveloping, password access protection, public key management, and/or the like. The cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. The cryptographic module facilitates the process of "security authorization" whereby access to a resource is inhibited by a security protocol wherein the cryptographic module effects authorized access to the secured resource. In addition, the cryptographic module may provide unique identifiers of content, e.g., employing and MD5 hash to obtain a unique signature for an digital audio file. A cryptographic module may communicate to and/or with other modules in a module collection, including itself, and/or facilities of the like. The cryptographic module supports encryption schemes allowing for the secure transmission of information across a communications network to enable an NSDHN module to engage in secure transactions if so desired. The cryptographic module facilitates the secure accessing of resources on NSDHN and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses.

NSDHN

An NSDHN module 535 is stored program code that is executed by the CPU. The NSDHN affects accessing, obtaining and the provision of information, and/or the like across various communications networks. The NSDHN has the ability to optimize the delivery of datacasts dynamically across a hybrid network. The NSDHN coordinates with the NSDHN database to identify interassociated items in the generation of entries regarding any related information. An NSDHN module enabling access of information between nodes may be developed by employing standard development tools such as, but not limited to: (ANSI) (Objective-) C (++), Apache modules, binary executables, Java, Javascript, mapping tools, procedural and object oriented development tools, PERL, Python, shell scripts, SQL commands, web application server extensions, WebObjects, and/or the like. In one embodiment, the NSDHN server employs a cryptographic server to encrypt and decrypt communications. An NSDHN module may communicate to and/or with other modules in a module collection, including itself, and/or facilities of the like. Most frequently, the NSDHN module communicates with an NSDHN database, operating systems, other program modules, and/or the like. The NSDHN may contain, communicate, generate, obtain, and/or provide program module, system, user, and/or data communications, requests, and/or responses.

Distributed NSDHN

The structure and/or operation of any of the NSDHN node controller components may be combined, consolidated, and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple controllers and/or storage devices; e.g., databases. All program module instances and controllers working in concert may do so through standard data processing communication techniques.

The configuration of the NSDHN controller will depend on the context of system deployment. Factors such as, but not limited to, the budget, capacity, location, and/or use of the underlying hardware resources may affect deployment requirements and configuration. Regardless of if the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, and/or the like, which allow for grammar generation and parsing functionality, which in turn may form the basis of communication messages within and between modules. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than for purposes of space and reducing repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in. part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A method of dynamic network delivery selection, comprising:

obtaining an objective with requirements of delivery of datacasts over hybrid bearers of network communications for users within an area supported by the bearers;

obtaining restrictions for the objective, wherein the restrictions further establish requirements for the objective, wherein the restrictions establish capacity limits;

determining a state of the hybrid bearers of network communications,
  wherein each type of bearer has a limited service capacity for an area,
  wherein the determination of state establishes a required capacity for datacasts,
  wherein the datacasts are requested by users within an area supported by the bearers,
  wherein the bearers support one or more of the following: broadcast, multicast, and unicast communications,
  wherein a datacast requires capacity,
  wherein a location of a datacast reception may move between the area supported by the bearers to another area as the datacast requesting user moves,
  wherein a location of a datacast receipt may move with the area supported by the bearers from one type of bearer to another as the datacast requesting user moves;
obtaining inputs for the objective and restrictions,
  wherein the inputs are obtained from the determined state;
generating a simulated population of bearers configurations based on the objective, restrictions, state, and inputs,
  wherein the simulated configuration that best fulfills the objective is used to fulfill the objective;
instructing the bearers of network communications to deliver datacasts employing the best generated simulated configuration;
transferring a user receiving a datacast from one type of bearer to another type of bearer to satisfy the objective and restrictions,
  wherein the transfer results from the instructions that are based on the best generated simulated configuration as dynamically determined,
  wherein the one type of bearer may be non-existent,
  wherein the another type of bearer may be non-existent,
  wherein the transfer encourages optimally satisfying the objective;
increasing capacity for one type of bearer in the supported area, if required to satisfy requirements of the objective,
  wherein more capacity may be added as constrained by the restrictions of the objective,
  wherein the determined state indicates that more capacity is needed;
decreasing capacity for one type of bearer in the supported area, if required to satisfy requirements of the objective,
  wherein more capacity may be removed as constrained by the restrictions of the objective,
  wherein the determined state indicates that less capacity is needed.

2. An dynamic network selector apparatus, comprising:
a memory;
a processor disposed in communication with said memory, and configured to issue a plurality of processing instructions stored in the memory, wherein the instructions issue signals to:
  obtain an objective with requirements of delivery of datacasts over hybrid bearers of network communications for users within an area supported by the bearers;
  obtain restrictions for the objective, wherein the restrictions further establish requirements for the objective, wherein the restrictions establish capacity limits;
  determine a state of the hybrid bearers of network communications,
    wherein each type of bearer has a limited service capacity for an area,
    wherein the determination of state establishes a required capacity for datacasts,
    wherein the datacasts are requested by users within an area supported by the bearers,
    wherein the bearers support one or more of the following: broadcast, multicast, and unicast communications,
    wherein a datacast requires capacity,
    wherein a location of a datacast reception may move between the area supported by the bearers to another area as the datacast requesting user moves,
    wherein a location of a datacast receipt may move within the area supported by the bearers from one type of bearer to another as the datacast requesting user moves;
  obtain inputs for the objective and restrictions,
    wherein the inputs are obtained from the determined state;
  generate a simulated population of bearers configurations based on the objective, restrictions, state, and inputs,
    wherein the simulated configuration that best fulfills the objective is used to fulfill the objective;
  instruct the bearers of network communications to deliver datacasts employing the best generated simulated configuration;
  transfer a user receiving a datacast from one type of bearer to another type of bearer to satisfy the objective and restrictions,
    wherein the transfer results from the instructions that are based on the best generated simulated configuration as dynamically determined,
    wherein the one type of bearer may be non-existent,
    wherein the another type of bearer may be non-existent,
    wherein the transfer encourages optimally satisfying the objective;
  increase capacity for one type of bearer in the supported area, if required to satisfy requirements of the objective,
    wherein more capacity may be added as constrained by the restrictions of the objective,
    wherein the determined state indicates that more capacity is needed;
  decrease capacity for one type of bearer in the supported area, if required to satisfy requirements of the objective,
    wherein more capacity may be removed as constrained by the restrictions of the objective,
    wherein the determined state indicates that less capacity is needed.

3. A computer medium readable having a processor to dynamically select a network, comprising:
instruction signals in the processor readable medium, wherein the instruction signals are issuable by the processor to:
  obtain an objective with requirements of delivery of datacasts over hybrid bearers of network communications for users within an area supported by the bearers;
  obtain restrictions for the objective, wherein the restrictions further establish requirements for the objective, wherein the restrictions establish capacity limits;

determine a state of the hybrid bearers of network communications,
wherein each type of bearer has a limited service capacity for an area,
wherein the determination of state establishes a required capacity for datacasts,
wherein the datacasts are requested by users within an area supported by the bearers,
wherein the bearers support one or more of the following: broadcast, multicast, and unicast communications,
wherein a datacast requires capacity,
wherein a location of a datacast reception may move between the area supported by the bearers to another area as the datacast requesting user moves,
wherein a location of a datacast receipt may move within the area supported by the bearers from one type of bearer to another as the datacast requesting user moves;
obtain inputs for the objective and restrictions,
wherein the inputs are obtained from the determined state;
generate a simulated population of bearers configurations based on the objective, restrictions, state, and inputs,
wherein the simulated configuration that best fulfills the objective is used to fulfill the objective;
instruct the bearers of network communications to deliver datacasts employing the best generated simulated configuration;
transfer a user receiving a datacast from one type of bearer to another type of bearer to satisfy the objective and restrictions,
wherein the transfer results from the instructions that are based on the best generated simulated configuration as dynamically determined,
wherein the one type of bearer may be non-existent,
wherein the another type of bearer may be non-existent,
wherein the transfer encourages optimally satisfying the objective;
increase capacity for one type of bearer in the supported area, if required to satisfy requirements of the objective,
wherein more capacity may be added as constrained by the restrictions of the objective,
wherein the determined state indicates that more capacity is needed;
decrease capacity for one type of bearer in the supported area, if required to satisfy requirements of the objective,
wherein more capacity may be removed as constrained by the restrictions of the objective,
wherein the determined state indicates that less capacity is needed.

4. A system to dynamically select a network, comprising:
means to obtain an objective with requirements of delivery of datacasts over hybrid bearers of network communications for users within an area supported by the bearers;
means to obtain restrictions for the objective, wherein the restrictions further establish requirements for the objective, wherein the restrictions establish capacity limits;
means to determine a state of the hybrid bearers of network communications,
wherein each type of bearer has a limited service capacity for an area,
wherein the determination of state establishes a required capacity for datacasts,
wherein the datacasts are requested by users within an area supported by the bearers,
wherein the bearers support one or more of the following: broadcast, multicast, and unicast communications,
wherein a datacast requires capacity,
wherein a location of a datacast reception may move between the area supported by the bearers to another area as the datacast requesting user moves,
wherein a location of a datacast receipt may move within the area supported by the bearers from one type of bearer to another as the datacast requesting user moves;
means to obtain inputs for the objective and restrictions,
wherein the inputs are obtained from the determined state;
means to generate a simulated population of bearers configurations based on the objective, restrictions, state, and inputs,
wherein the simulated configuration that best fulfills the objective is used to fulfill the objective;
means to instruct the bearers of network communications to deliver datacasts employing the best generated simulated configuration;
means to transfer a user receiving a datacast from one type of bearer to another type of bearer to satisfy the objective and restrictions,
wherein the transfer results from the instructions that are based on the best generated simulated configuration as dynamically determined,
wherein the one type of bearer may be non-existent,
wherein the another type of bearer may be non-existent,
wherein the transfer encourages optimally satisfying the objective;
means to increase capacity for one type of bearer in the supported area, if required to satisfy requirements of the objective,
wherein more capacity may be added as constrained by the restrictions of the objective,
wherein the determined state indicates that more capacity is needed;
means to decrease capacity for one type of bearer in the supported area, if required to satisfy requirements of the objective,
wherein more capacity may be removed as constrained by the restrictions of the objective,
wherein the determined state indicates that less capacity is needed.

* * * * *